| United States Patent [19] | [11] | 4,450,398 |
|---|---|---|
| Bose | [45] | May 22, 1984 |

[54] MICROPROCESSOR-BASED EFFICIENCY OPTIMIZATION CONTROL FOR AN INDUCTION MOTOR DRIVE SYSTEM

[75] Inventor: Bimal K. Bose, Latham, N.Y.

[73] Assignee: General Electric Company, Schenectady, N.Y.

[21] Appl. No.: 365,720

[22] Filed: Apr. 5, 1982

[51] Int. Cl.³ .............................................. H02P 5/34
[52] U.S. Cl. ..................................... 318/803; 318/806
[58] Field of Search ................................ 318/798–803, 318/807–811, 806, 804, 805

[56] References Cited

U.S. PATENT DOCUMENTS

| 4,088,935 | 5/1978 | D'Atre | 318/802 |
|---|---|---|---|
| 4,099,107 | 7/1978 | Eder | 318/802 |
| 4,207,510 | 6/1980 | Woodbury | 318/802 |
| 4,243,927 | 1/1981 | D'Atre | 318/803 |
| 4,276,505 | 6/1981 | Bose | 318/723 |
| 4,281,276 | 7/1981 | Cutler | 318/803 |
| 4,314,190 | 2/1982 | Walker | 318/808 X |
| 4,330,741 | 5/1982 | Nagase | 318/803 |

*Primary Examiner*—S. J. Witkowski
*Assistant Examiner*—Patrick Keane
*Attorney, Agent, or Firm*—William H. Steinberg; James C. Davis, Jr.; Marvin Snyder

[57] ABSTRACT

A microcomputer for use with an induction motor drive system processes machine drive system currents, voltages and speed to compute real time machine efficiency. From real time machine efficiency determinations, the microcomputer determines the optimum combination of machine slip frequency and machine air gap flux. The magnitude and frequency of machine stator current are regulated, responsive to the difference in magnitude between optimum machine air gap flux and actual machine air gap flux, and the difference in magnitude between optimum slip frequency and actual slip frequency, respectively, to assure machine steady state operation at maximum efficiency irrespective of machine load conditions.

6 Claims, 20 Drawing Figures

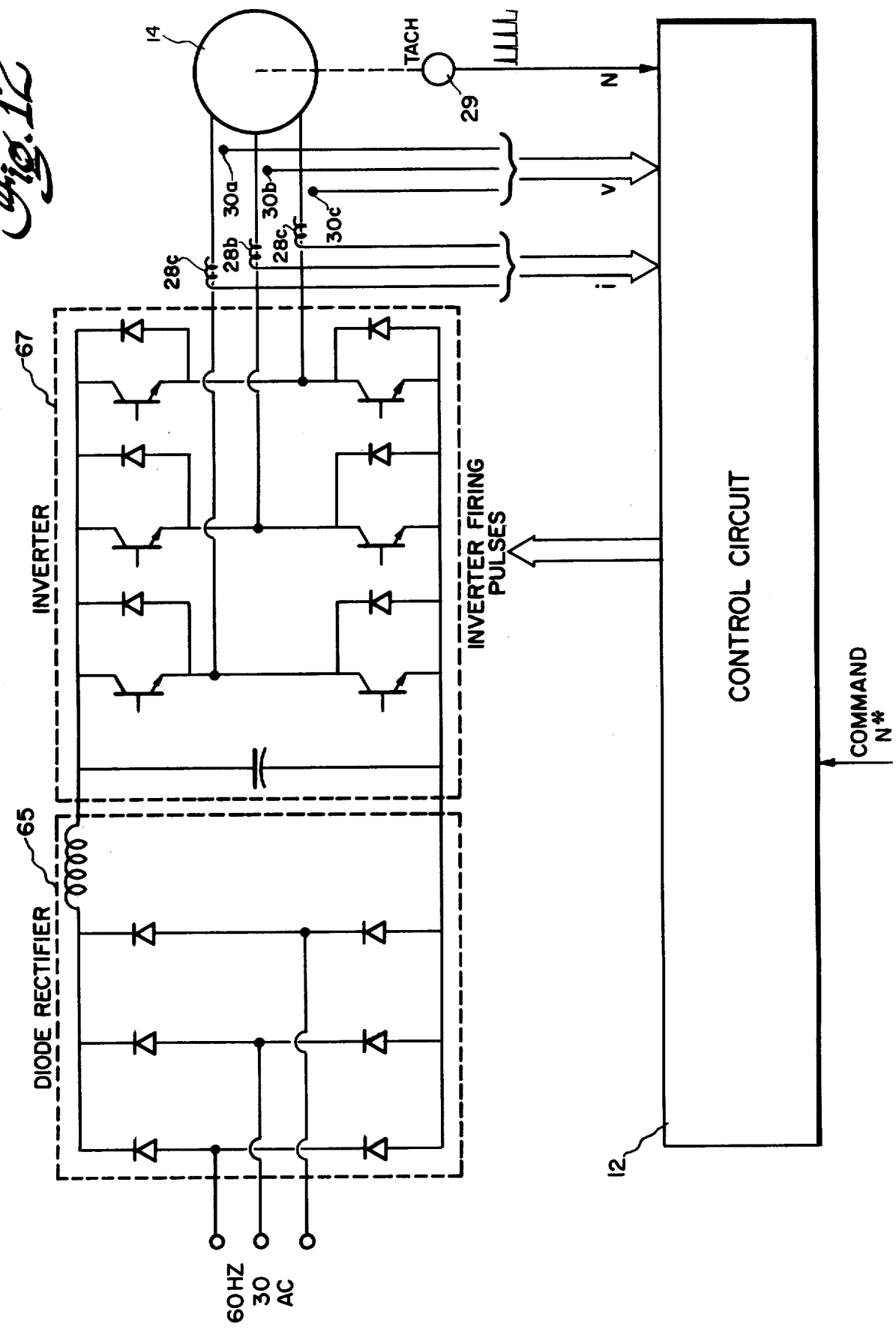

MICROPROCESSOR-BASED EFFICIENCY OPTIMIZATION CONTROL FOR AN INDUCTION MOTOR DRIVE SYSTEM

This application is related to my compending application Ser. No. 334,119, entitled "Microcomputer Based Control Apparatus for a Direct Current Machine Drive System," filed Dec. 24, 1981 which is a continuation of Ser. No. 124,346, filed Feb. 25, 1980, now abandoned. The above pending application is assigned to the same assignee as the present invention.

This application is related to copending application Ser. No. 135,215, now U.S. Pat. No. 4,276,505, filed Mar. 31, 1980 entitled "Microcomputer-Based Control Apparatus for a Load-Commutated Inverter-Synchronous Machine Drive System" by the same inventor as the present invention and assigned to the same assignee as the present invention.

BACKGROUND OF THE INVENTION

This invention relates generally to induction machines, and, more specifically, to a control apparatus for regulating the frequency and magnitude of machine stator current or voltage in accordance with machine efficiency computed in real time to obtain maximum steady state machine efficiency irrespective of machine load conditions.

Adjustable speed induction machine drive systems have become increasingly popular for various industrial applications. Due to significantly increasing energy costs, it is highly desirable to operate these machine drive systems at peak efficiency. In large horsepower systems, a small increase in machine efficiency can result in substantial cost savings.

Prior art drive systems for induction motors fall into two primary categories: current-fed inverter and voltage-fed inverter drive systems. In both systems, machine performance is controlled by adjusting the magnitude and frequency of stator currents generated by the drive system and applied to the stator coils of the induction machine. In these systems, the air gap flux of the motor is either held constant or is varied in a predetermined functional relationship with developed torque. The later mode is designed to make the machine efficiency optimum under the assumptions that: (1) torque is uniquely related to speed; (2) machine parameters are constant; and (3) voltage and current waves do not contain any harmonics. In practical drive systems, such conditions can rarely be met.

In contrast, the control apparatus of the present invention obtains optimum machine efficiency by regulating the magnitude and frequency of machine stator current or voltage responsive to optimum machine air gap flux and optimum machine slip frequency which are determined in accordance with machine efficiency computed in real time.

It is an object of the present invention to provide a microcomputer based control apparatus for an induction machine drive system.

It is another object of the present invention to provide a microcomputer-based control apparatus for regulating frequency and magnitude of the stator currents (or stator voltages) of an induction machine drive system by feedback control responsive to optimum slip frequency and optimum machine air gap flux, respectively, which are determined in accordance with real time machine efficiency.

BRIEF SUMMARY OF THE INVENTION

Briefly, in accordance with the preferred embodiment of the invention, a control apparatus for regulating the stator currents or voltages supplied to an induction machine to obtain optimum machine efficiency irrespective of machine load conditions comprises a signal processing circuit coupled to the induction machine and responsive to machine stator current and voltage. The signal processing circuit, typically configured of a microcomputer, processes machine stator currents, voltages and speed, and, in accordance with the magnitudes thereof, computes machine efficiency in real time. In accordance with machine efficiency, the signal processing circuit produces a pair of output signals, the first varying in accordance with optimum slip frequency, and the second varying in acordance with optimum machine air gap flux. The first signal processor output signal is supplied to a first control loop which regulates the magnitude of the stator currents or voltages responsive to the difference in magnitude between optimum machine air gap flux and actual air gap flux. The second control loop is supplied with the second signal and controls the frequency of stator currents (or stator voltages) responsive to the difference in frequency between optimum and actual slip frequency. Regulation of machine stator currents (or stator voltages) in accordance with real time machine efficiency in the manner described above results in optimum machine efficiency irrespective of machine load conditions.

BRIEF DESCRIPTION OF THE DRAWINGS

The features of the invention believed to be novel are set forth with particularity in the appended claims. The invention itself, both as to organization and method of operation, together with further objects and advantages thereof, may best be understood by reference to the following description taken in conjunction with the accompanying drawings in which:

FIG. 12 is a part schematic, part block diagram of a voltage fed induction machine drive system incorporating the control apparatus of the present invention.

DETAILED DESCRIPTION OF THE PREFERRED EMBODIMENT

Figure 1:
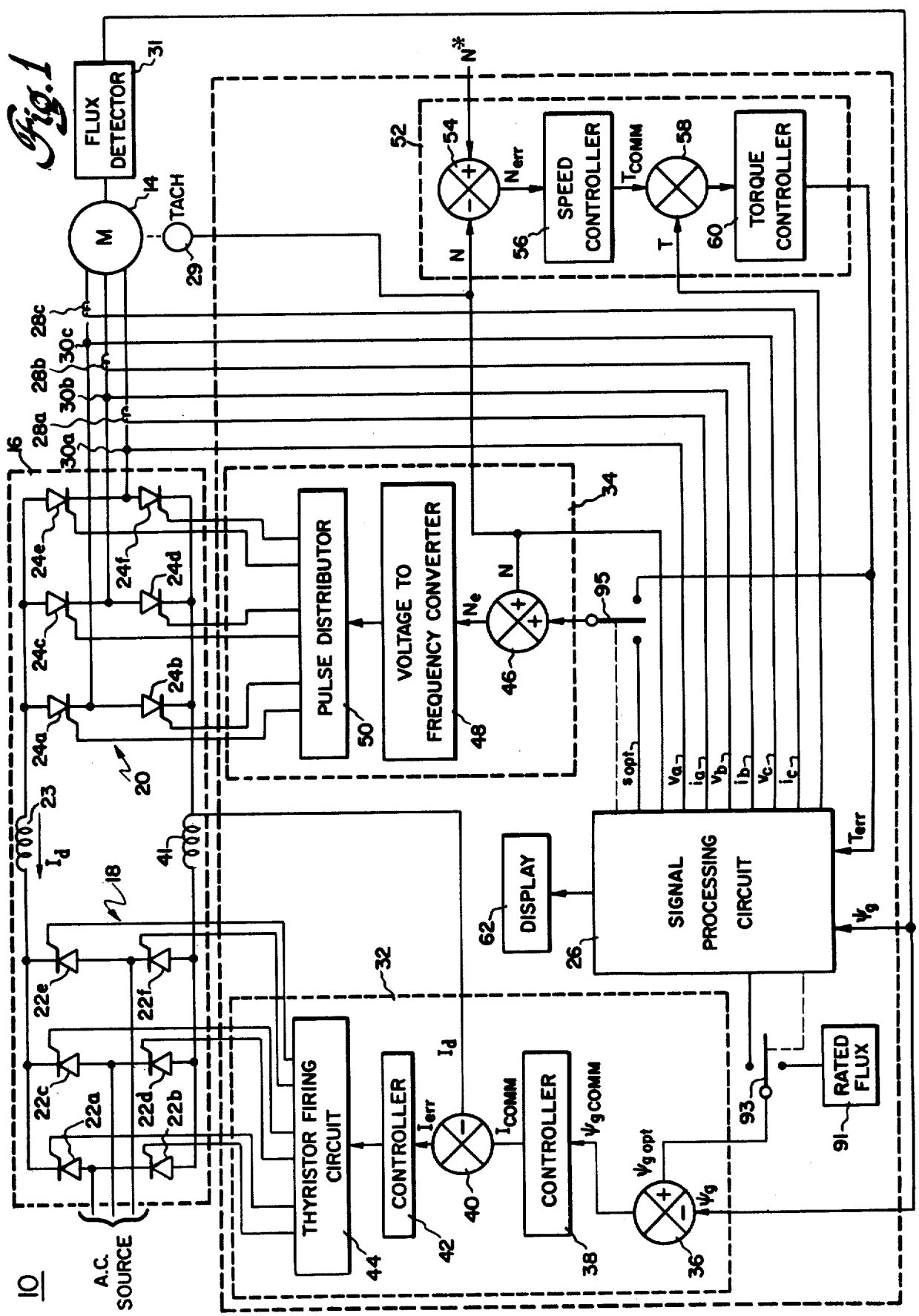
FIG. 1 is a part schematic, part block diagram of an induction machine drive system including the control apparatus of the present invention.

Referring now to the drawings, wherein like numbers indicate like elements, there is illustrated in FIG. 1 an induction motor drive system 10 which incorporates a control circuit 12 constructed in accordance with the principles of the present invention. Drive system 10 includes an induction motor 14, which is energized by a power supply 16 under the control of control circuit 12. Power supply 16 includes a dc source 18 and an inverter circuit 20. In the presently preferred embodiment, dc source 18 comprises a phase controlled rectifier including three pairs of thyristors 22a and 22b, 22c and 22d, 22e and 22f, respectively. The thyristors of each pair are coupled in series-aiding fashion and each of the pairs of thyristors is coupled in parallel with each other. The junction between thyristors of each pair is coupled to one of the three phases, respectively, of a three phase alternating current source (not shown). Thyristors 22a-22f are rendered conductive in a predetermined sequence responsive to firing signals supplied to the gate of each thyristor by control circuit 12.

The output of dc source 18 is a dc current Id whose magnitude is determined by the sequence of firing pulses applied to thyristors 22a-22f and determines the magnitude of the stator currents applied to motor 14. This current is supplied to inverter 20 via an inductor 23. In the presently preferred embodiment, inverter 20 comprises a phase controlled inverter including three pairs of thyristors 24a and 24b, 24c and 24d, and 24e and 24f, respectively. Each pair of thyristors is connected in series-aiding fashion and each pair is coupled in parallel with the remaining pairs. The polrity of thyristors 24a-24f is opposite to that of thyristors 22a-22f. In each of dc source 18 and inverter 20, a junction between the thyristors of each pair is coupled to one of the three phases, respectively, of the stator coils of induction motor 14. Thyristors 24a-24f are rendered conductive in a predetermined sequence responsive to firing signals supplied to the gate of each thyristor 24 by control circuit 12. As will be described in greater detail below, control circuit 12 adjusts the frequency of these firing pulses in a manner which causes motor 14 to operate at the desired speed and at the optimum slip frequency to maximize machine efficiency during steady state conditions.

To assure maximum machine drive system efficiency during steady state, irrespective of machine load and speed conditions, control circuit 12 regulates the frequency and magnitude of the stator currents in accordance with machine efficiency in real time. The control circuit 12 includes a signal processing circuit 26, typically a microcomputer. Signal processing circuit 26 receives a first set of signals, $i_a$, $i_b$ and $i_c$ representative of the stator currents of the respective phases of motor 14 via current detectors 28a, 28b and 28c, respectively.

Signal processing circuit 26 also receives a second set of signals $v_a$, $v_b$ and $v_c$ representative of the stator voltages of the respective phases of motor 14 via voltage detectors 30a 30b and 30c. A speed signal N indicative of the angular velocity of the output shaft of motor 14 is supplied to signal processing circuit 26 via a tachometer 29 coupled to the output shaft of motor 14. A flux detector 31 detects the air gap flux located between the stator and rotor of motor 14 and generates a flux signal indicative thereof. This signal is also applied to signal processing circuit 26. If desired, flux detector 31 can be omitted and signal processing circuit 26 can calculate the flux as a function of the stator currents and voltages in a manner set forth in U.S. Pat. No. 4,245,181, issued Jan. 13, 1981 and assigned to the instant assignee, which patent is hereby incorporated by reference.

The motor voltage, current and speed provide signal processing circuit 26 with all the relevant operating parameters of motor 14. The signal processing circuit has the motor characteristic parameters stored in memory. Signal processing circuit 26 processes the signals representing these parameters and generates first and second output signals as a function thereof. These signals are representative of the optimal air gap flux $\psi_g$ opt and the optimal slip frequency $s_{opt}$ of motor 14 which will result in maximum machine efficiency during steady state conditions.

In order to better understand how signals $\psi_g$ opt and $s_{opt}$ are obtained from machine parameters applied to signal processing circuit 26 and motor characteristic parameters stored in processing circuit 26, a brief review of the relation between induction machine parameters and machine losses, and the relationship between machine losses and machine efficiency, will be presented. The general loss expressions of an induction motor are given in equations 1, 2, 3 and 4 that follow. The machine losses Pcs attributable to stator copper loss are given by the expression:

$$Pcs = 3I_s^2(\text{rms})R_s \tag{1}$$

where $I_s$(rms) is the rms value of the stator current and $R_s$ is the stator resistance. The losses Pcr attributable to rotor copper loss are given by the equation:

$$Pcr = 3I_r^2(\text{rms})R_r \tag{2}$$

wherein $I_r$ is the equivalent rotor current and $R_r$ is the equivalent rotor resistance as viewed from the stator side of motor 14. Core losses P core attributable to machine iron are given by the relationship:

$$P\text{ core} = K_1 f \psi_g^2 + K_2 f^2 \psi_g^2 \tag{3}$$

where $K_1$ and $K_2$ are constants, $\psi_g$ is machine air gap flux and f is the frequency of the stator currents of motor 14. The losses Pfw attributable to machine friction and windage are given by the expression:

$$Pfw = K_3 N^3 \tag{4}$$

wherein $K_3$ is a constant and N is the speed (in radians per second) of the output shaft of motor 14.

If the rotor leakage inductance effect is neglected, the torque of machine 14 can be expressed as:

$$T = K_4 \psi_g^2 s \tag{5}$$

wherein s is the slip frequency (rad/sec) ($s = Ne - N$) of motor 14. Ne is the frequency command to the inverter.

The machine efficiency $\eta$, defined as the ratio of machine output power to machine input power can be expressed as:

$$\eta = 1 - \frac{Pes + Per + P\text{core} + Pfw}{\frac{1}{2\pi} \int (v_a i_a + v_b i_b + v_c i_c) dt} \tag{6}$$

wherein $v_a$, $v_b$ and $v_c$ are the instantaneous stator phase voltages and $i_a$, $i_b$ and $i_c$ are the instantaneous stator phase currents.

During steady state conditions, that is, when the machine parameters are relatively constant, $\eta$ can be expressed as a function of the machine parameters N, s, $\psi_g$ and T:

$$\eta = f(N, s, \psi_g, T) \tag{7}$$

Figure 2A:
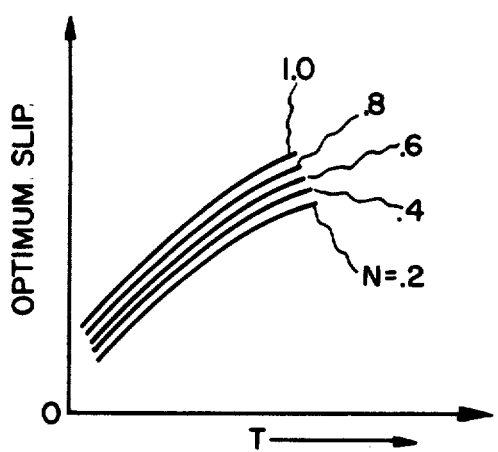
FIG. 2A is a graphical illustration of the relationship between optimum slip frequency and load torque for each of several values of machine speed.
Figure 2B:
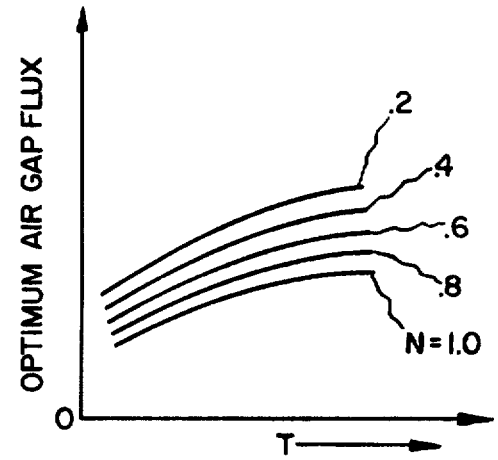
FIG. 2B is a graphical illustration of the relationship between optimum machine air gap flux and load torque for each of several values of machine speed.

Once the actual values of the machine speed N and the load torque T are obtained, optimum values for machine slip frequency $s_{opt}$ and machine air gap flux $\psi_g$ opt, respectively, can be computed from equation (7). Load torque can be calculated from motor currents and voltages in FIG. 10. The relationship between per unit optimum slip frequency and per unit load torque for each of several per unit values of machine speed is illustrated in FIG. 2A and the relationship between optimum air gap flux and load torque for each of several values of per unit speed is illustrated in FIG. 2B. The losses in the machine are determined from machine equivalent circuit parameters and variables. Temperature, saturation and skin effects can be taken into account, if desired. The loss computation method that follows can be applied to voltage-fed as well as current-fed drive systems, with the machine stator current having any waveform. The machine equivalent circuit in the presence of harmonics can be represented in the modified form shown in FIG. 3A where the values shown are for one phase of the induction motor winding and all rotor values are in stator terms. A stator impedance 21 is in series with the parallel combination of a rotor impedance 25 and a magnetizing branch impedance 27. A phase voltage $V_s$ is supplied to the equivalent circuit through the stator impedance 21. The stator impedance 21 comprises the series combination of the stator resistance $r_1$ with the parallel combination of the leakage reactance $X_1$ and the induced stray loss equivalent resistance $r_{1L}$. The magnetizing branch 33 comprises the parallel combination of the magnetizing reactance $X_m$ and the equivalent resistance for the core loss $R_c$. The rotor impedance 25 comprises a resistance equal to the rotor resistance divided by the induction motor slip $r_2/s$, in series with the parallel combination of the leakage reactance and a resistance of value $r_{2L}/s$ representing the induced stray loss divided by the slip.

The resistance expressions that follow are derived in an IEEE IAS Conference Record Paper, September 1980, entitled "Induction Motors Operating from Inverters," by V. B. Honsinger, which paper is hereby incorporated by reference.

$$r_{1L} = r_{1Lb} \frac{f}{f_b} \cdot \frac{1 + f_b r_1}{1 + f r_1} \tag{8}$$

$$r_{2L} = 50 \, r_{2Lb} \frac{f}{f_b} \cdot \frac{1 + 0.1 f_b r_2}{1 + 5 f r_2} \tag{9}$$

and $$r_c = \frac{1}{k_c \left[ \frac{1.1 k_h}{f} + 1.01 k_e \right]} \tag{10}$$

Equations (8), (9) and (10) show how values of $r_{1L}$, $r_{2L}$ and $r_c$ can be derived for an induction motor. f is the frequency of operation and $f_b$ is the base frequency. $k_h$ and $k_e$ are hysteresis eddy current coefficients. $k_h$, $k_e$ and $k_c$ are properties of the material and machine configuration and do not change with frequency.

Figure 3A:
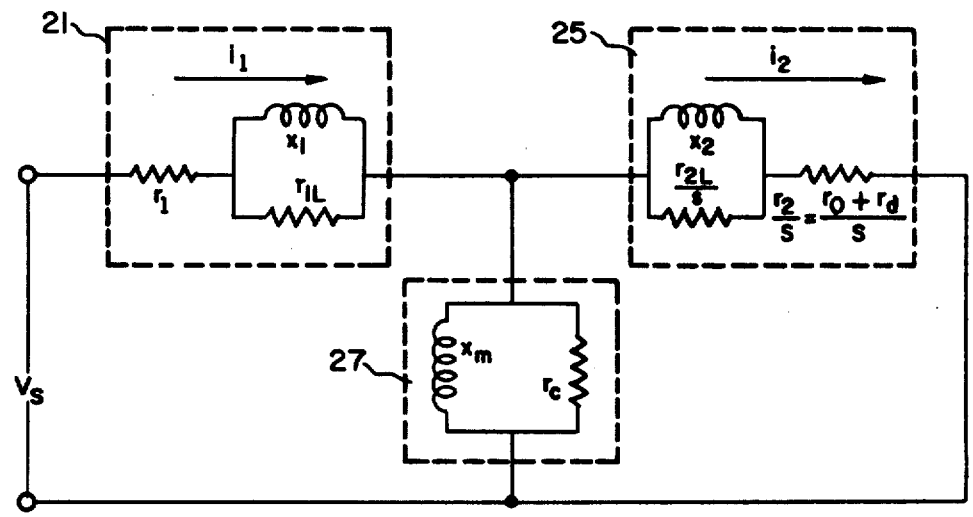
FIG. 3A is an equivalent circuit representation of an induction motor using parallel elements.
Figure 3B:
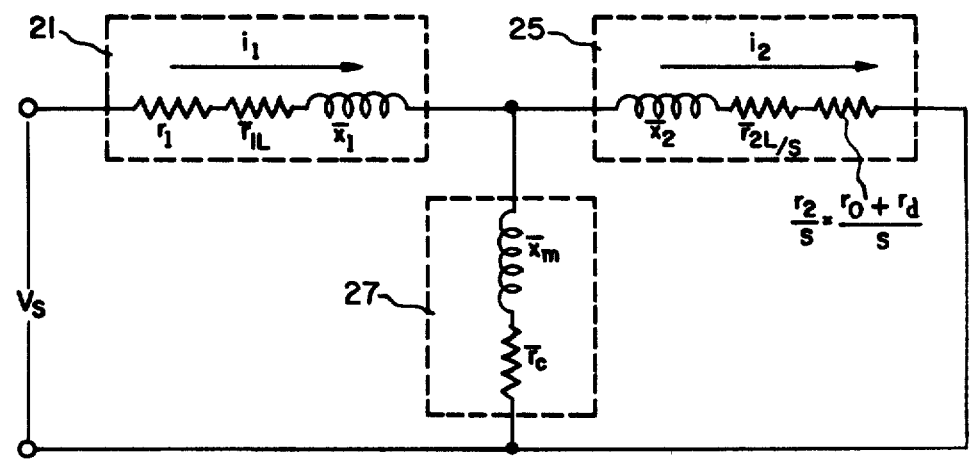
FIG. 3B is an equivalent circuit representation of an induction motor using series elements.

The parallel elements in FIG. 3A can be converted to equivalent series elements shown in FIG. 3B where $$\bar{r}_1 = \frac{r_{1L}}{1 + \left(\frac{r_{1L}}{x_1}\right)^2} \tag{11}$$

$$\bar{x}_1 = \frac{x_1}{1 + \left(\frac{x_1}{r_{1L}}\right)^2} \tag{12}$$

$$\bar{r}_2 = \frac{r_{2L}}{1 + \left(\frac{r_{2L}}{x_2}\right)^2} \tag{13}$$

$$\bar{x}_2 = \frac{x_2}{1 + \left(\frac{x_2}{r_{2L}}\right)^2} \tag{14}$$

$$\bar{r}_c = \frac{r_c}{1 + \left(\frac{r_c}{x_m}\right)^2} \tag{15}$$

$$\bar{x}_m = \frac{x_m}{1 + \left(\frac{x_m}{r_c}\right)^2} \tag{16}$$

The "barred" quantities in equations (11)–(16) are the series equivalents of the impedances shown in FIG. 3A. In FIG. 3B the stator impedance 31 comprises the series combination of resistance $r_1$, resistance $\bar{r}_{1L}$ and inductive reactance $\bar{X}_1$, the rotor impedance 25 comprises the series combination of inductive reactance $\bar{X}_2$, resistance $\bar{r}_{2L}/s$, and resistance $r_2/s$ and the magnetizing branch impedance 33 comprises the parallel combination of inductive reactance $X_m$ and resistance $r_c$. If one phase of the stator current wave $i_1$ and the circuit parameters are known accurately, the equivalent circuit of FIG. 3B can be solved to compute copper and iron losses.

Figure 4A:
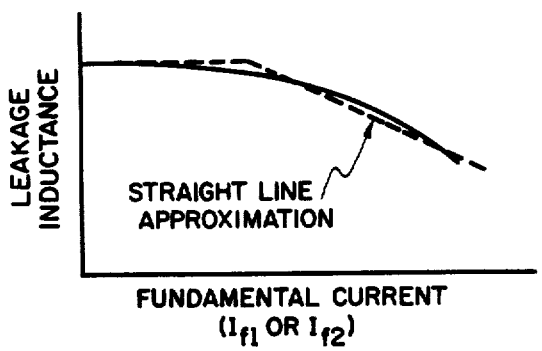
FIGS. 4A and 4B show inductance saturation curves for approximating circuit values.
Figure 4B:
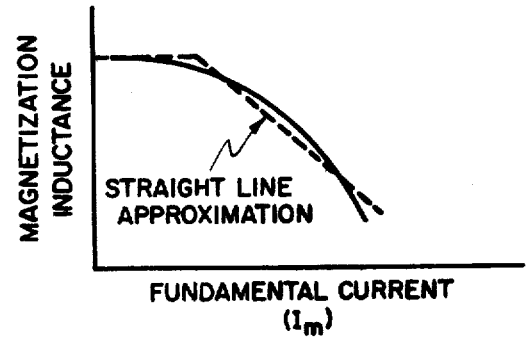
Figure 5:
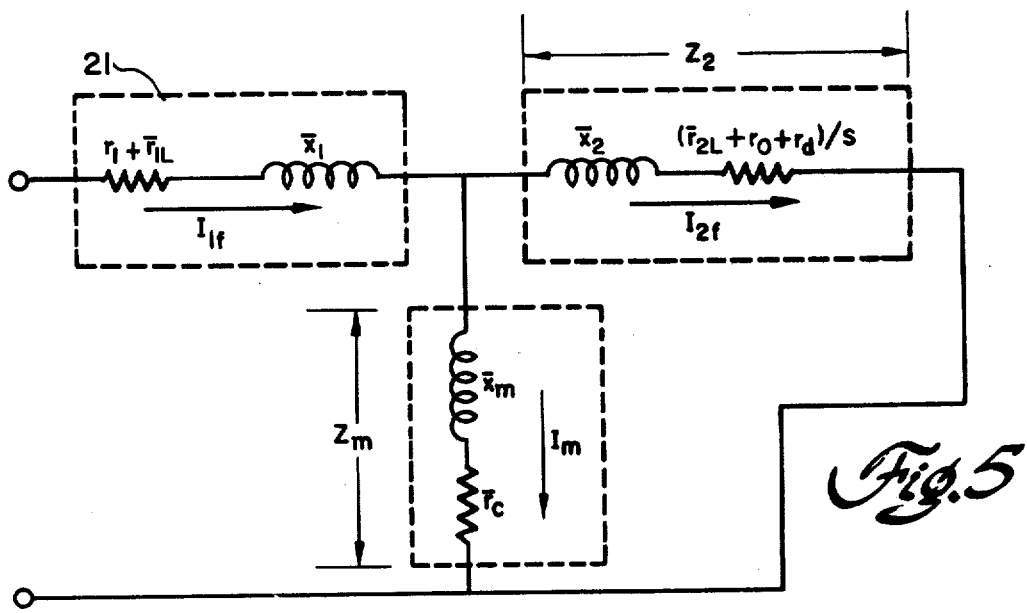
FIG. 5 is an equivalent circuit representation of an induction motor at fundamental frequency.

The saturation effect on leakage and magnetizing inductances in FIG. 3A can be determined by locked rotor and no-load tests, respectively, and plotted as shown in FIGS. 4A and B. The inductances can be expressed approximately by a straight line equation in the following form $$L = L_0 \quad 0 < I_f < I_{fc} \tag{17}$$

$$= -m I_f + L_1 I_{fc} < I_f \tag{18}$$

where $I_f$ = fundamental component of current. The equivalent circuit of FIG. 3B can be redrawn in FIG. 5 for the fundamental component of current, where $r_2 = r_o + r_d$. The resistance of the rotor cage $r_o$ is not affected by the rotor bar skin effect and $r_d$ is the increase in rotor resistance due to the displacement of currents in the rotor bars due to rotor bar skin effect. The stator impedance 31 at a fundamental frequency is the same as the stator impedance in FIG. 3B. The magnetizing branch impedance at the fundamental frequency $Z_m$ is the same as the magnetizing branch impedance in FIG. 3B. The rotor impedance at the fundamental frequency $Z_2$ is the series combination of $(r_{2L} + r_o + r_d)/s$ and $X_2$. The fundamental frequency loss components can be expressed as $$P_{cs(f)} = 3 I_{1f}^2 (r_1 + \bar{r}_1) \quad (19)$$

$$P_{cr(f)} = 3 I_{1f}^2 \frac{|Z_2|^2}{|Z_2 + Z_m|^2} (\bar{r}_2 + r_o + r_d) \quad (20)$$

$$P_c = 3 I_{1f}^2 \frac{|Z_m|^2}{|Z_2 + Z_m|^2} \bar{r}_c \quad (21)$$

where the core loss is considered to be contributed entirely by the fundamental component.

The skin effect of resistance at fundamental frequency can be neglected, but the temperature effect can be given as $$r_1 = r_{10}(1 + \alpha T_s) \quad (22)$$

$$r_o = r_{oo}(1 + \alpha T_r) \quad (23)$$

$$r_d = r_{d0}(1 + \alpha T_r) \quad (24)$$

whee $\alpha$ = temperature coefficient of the resistors, $T_s$ is the stator temperature and $T_r$ is the rotor temperature. The stator and rotor temperatures can be considered equal at steady state and can be measured by a thermistor in the stator of motor 14.

Figure 6:
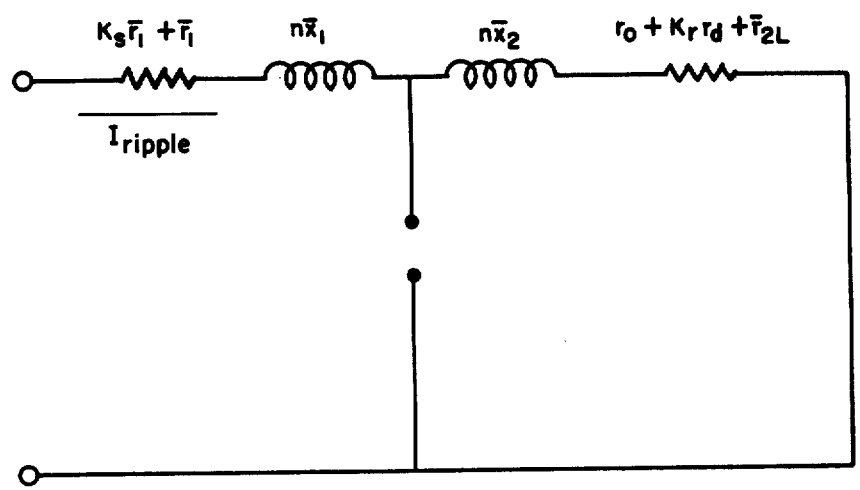
FIG. 6 is an equivalent circuit representation of an induction motor for ripple current.

At harmonic frequencies the resistance skin effect is dominant per unit and the slip (s) can be assumed to be unity. FIG. 6 shows the equivalent circuit for ripple current. The stator impedance to ripple current is the series combination of resistance $K_s \bar{r}_1 + r_1$ and inductive reactance $nX_1$ where $K_s$ is the skin effect factor and n is the order of the harmonic. The rotor impedance to ripple current is the series combination of inductive reactance $nX_2$ and resistance $r_o + K_r r_d + \bar{r}_{2L}$ where $K_r$ is the skin effect factor for the rotor. The magnetizing branch is considered open when ripple current is considered. The loss components due to ripple current are given as $$P_{cs(r)} = 3 I_{ripple}^2 (K_s \bar{r}_1 + \bar{r}_1) \quad (25)$$

$$P_{cr(r)} = 3 I_{ripple}^2 (\bar{r}_2 + r_o + K_r r_d) \quad (26)$$

Figure 7:
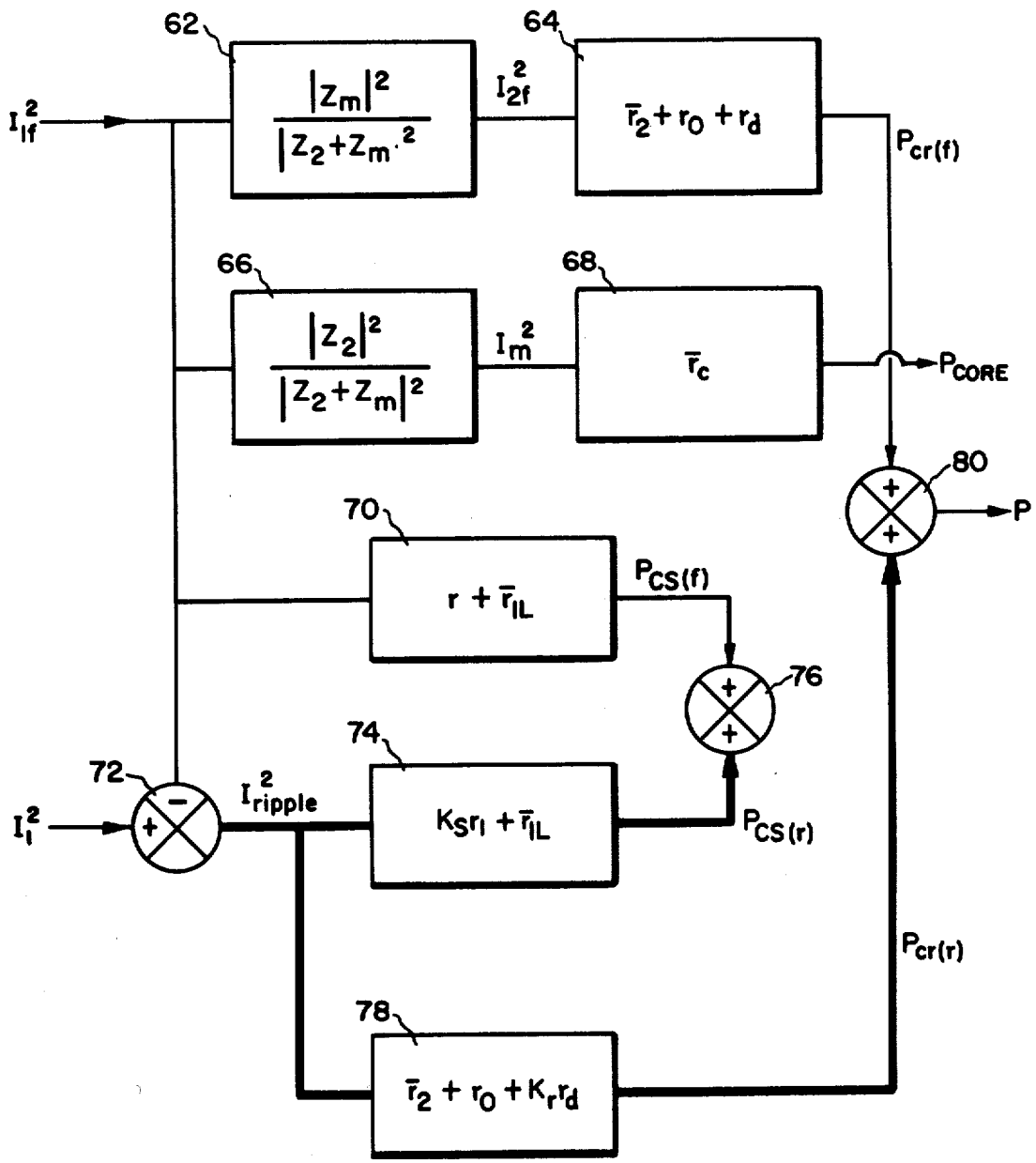
FIG. 7 is a computational block diagram representation of induction motor losses.

A computational block diagram of the losses is shown in FIG. 7, where $I_1$ is the total stator rms current and $I_{1f}$ is the stator fundamental rms current.

An explanation of how $I_1$ and $I_{1f}$ are obtained follows. he stator fundamental rms current squared is multiplied by the impedance ratio as indicated in block 62, to obtain the rotor fundamental rms current squared which, when multiplied by the rotor copper resistance at the fundamental frequency, as indicated by block 64, represents the losses attributable to rotor copper losses at the fundamental frequency Pcr(f). The squared current in the magnetizing branch $I_m$ is determined by multiplying the fundamental current by the impedance ratio, as indicated in block 66. The magnetizing current squared is multiplied by the core resistance, as indicated in block 68, to determine the core losses Pcore. The stator fundamental rms current squared is also multiplied by the stator copper resistance, as indicated in block 70, to obtain the stator copper loss at the fundamental frequency. The difference between the rms current squared $I_1^2$ and the fundamental rms current squared $I_{1f}^2$ is obtained by a summation operation represented by summer 72. The ripple current square $(I_{ripple})^2$. The multiplied by the stator copper resistance at ripple frequencies, as indicated in block 74, provides the value of stator copper losses at ripple frequencies Pcs(r), which is summed, as indicated by summer 76, with the stator copper losses determined by the operation represented by block 70, to obtain the stator copper loss Pcr. The ripple current squared is also multiplied by the rotor resistance at ripple frequencies to obtain Pcr(r), as indicated by block 78. The rotor copper loss at ripple frequencies is summed, as indicated by summer block 80, with the rotor copper losses at the fundamental frequency, as determined by the operation represented by block 64, to obtain the rotor copper loss Pcr.

Figure 8:
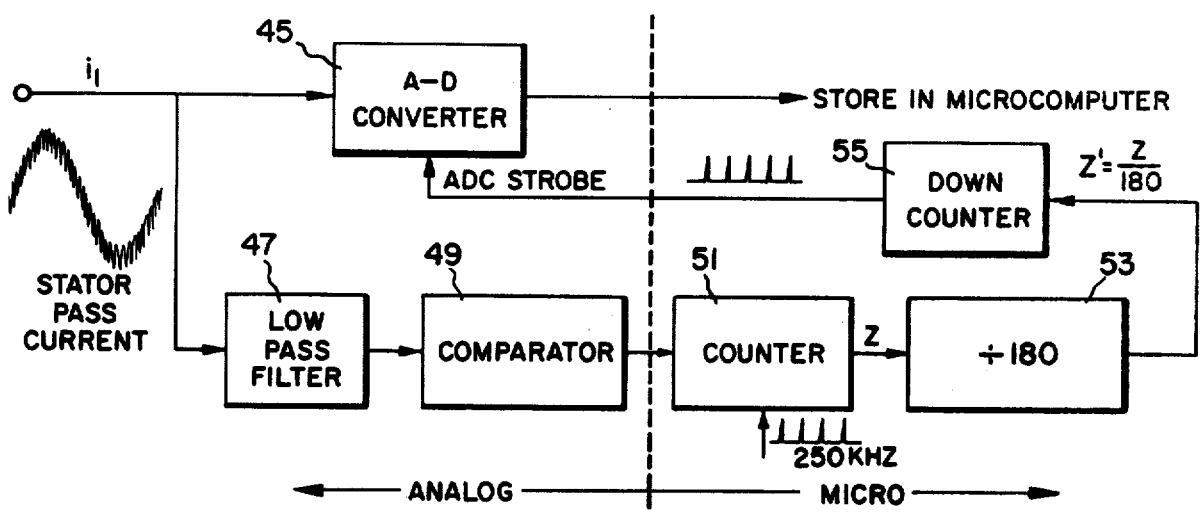
FIG. 8 is a functional block diagram of signal processing circuitry for sampling induction motor stator current.
Figure 9:
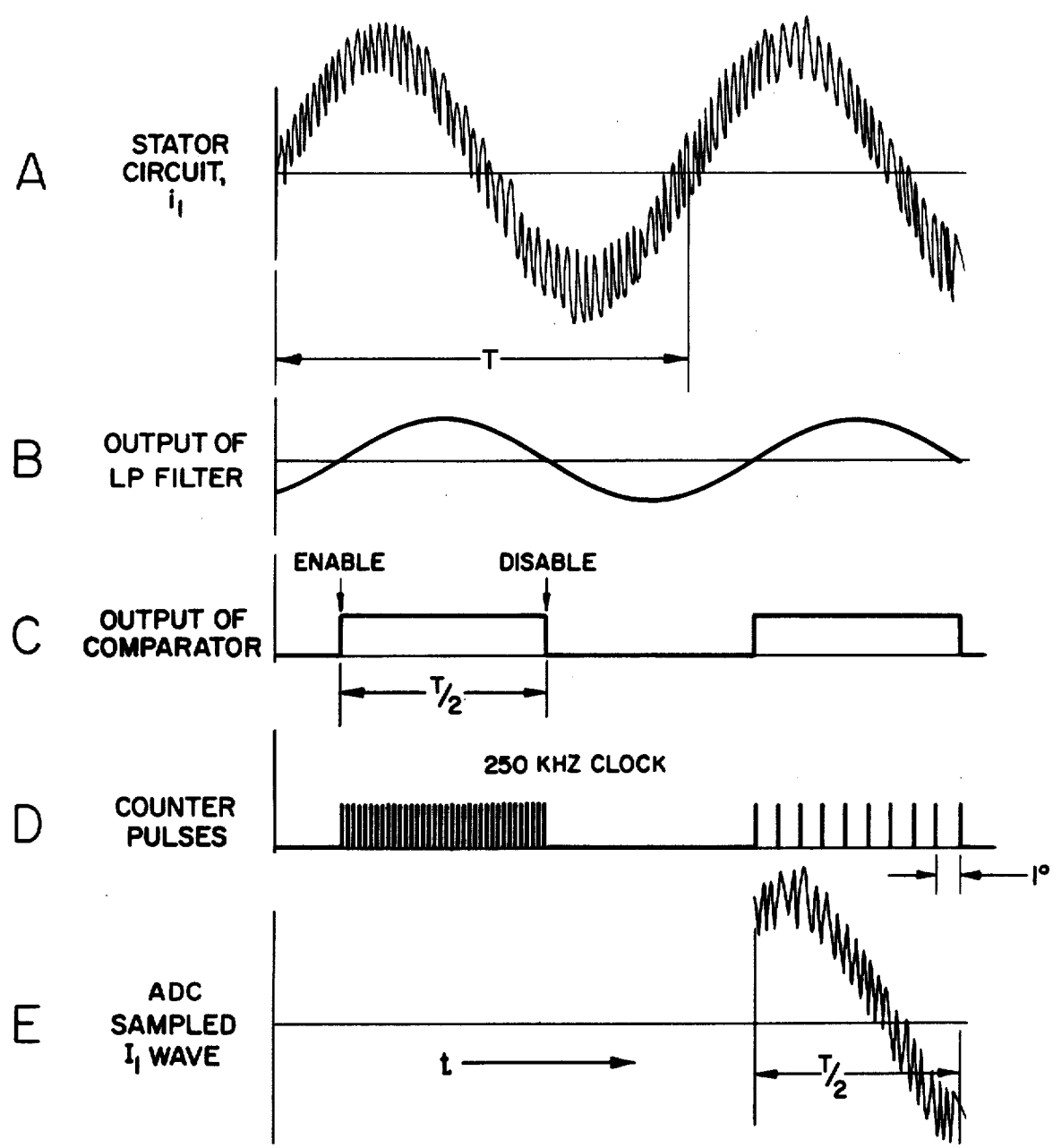
FIGS. 9 A, B, C, D and E are waveform diagrams, on a common scale, helpful in explaining the operation of FIG. 8.

FIG. 8 shows the signal processing for an analog-to-digital (A-D) sampling of stator current. One phase of the machine stator current wave $i_1$ is sampled by an A-D converter 45. The current wave $i_1$, shown in FIG. 9A, is smoothed by a low-pass filter 47 which also introduces a delay, as shown in FIG. 9B. The output of the low pass filter is passed through a comparator 49 to detect zero crossings to generate the logic wave for a half-cycle of fundamental frequency. The output waveform of the comparator is shown in FIG. 9C. In the first half-cycle, as shown in FIG. 9D, a counter 51 is enabled to count the pulses (Z) of a 250 kHz clock signal. The pulse count is then divided by 180 in divider circuit 53 to generate a signal indicative of a number of Z' which corresponds to the number of 250 kHz clock pulses for every 1 degree of $i_1$. The signal indictive of number Z' is supplied to a down counter 55, which is clocked at 250 kHz rate. When Z' is counted down, and output pulse is sent out to the A-D converter 45 and Z' is reloaded into the countdown counter 55. The 180 samples of current wave shown in FIG. 9E are stored in microcomputer memory for computation of rms and fundamental current in the next half-cycle. The computation algorithm for determining the rms value of $i_1$ and the fundamental rms component can be given as $$I_1^2 = \frac{1}{K} \sum_{J=1}^{K} i_1^2(J) \quad (27)$$

$$a(1) = \frac{2}{K} \sum_{J=1}^{K} i_1(J) \cos \frac{\pi J}{K} \quad (28)$$

$$b(1) = \frac{2}{K} \sum_{J=1}^{K} i_1(J) \sin \frac{\pi J}{K} \quad (29)$$

$$I_{1f}^2 = \frac{a(1)^2}{2} + \frac{b(1)^2}{2} \quad (30)$$

where $I_1$ is the rms value of current wave $i_1$ and wherein a(1) and b(1) are the peak currents of the fundamental component of $i_1$ determined from the Fourier series of $i_1$. $I_{1f}$ is the rms value of the current is a single phase. The summation can be performed over a half wave since the waveform $i_1$ has half wave symmetry. Look-up tables containing values at 1 degree intervals and for 1.0 per unit amplitude are stored in the microcomputer memory. The computed values of $I_1{}^2$ and $I_1{}^2$ are then employed as indicated in FIG. 7 for calculating losses. The total computation, including parameter estimation, can be completed within 2 ms, permitting machine operation with up to 250 Hz of fundamental frequency.

One possible approach for determining $\psi_g$ opt and $S_{opt}$ is to generate two sets of look-up tables, the first set containing tables of optimum slip frequency and corresponding torque values, and the second set containing tables of optimum machine air gap flux and corresponding torque values, with each table of optimum slip frequency and optimum air gap flux corresponding to a particular machine speed N. These sets of tables may be stored in a memory of signal processing circuit 26, shown in FIG. 1. Once the magnitudes of load torque and speed have been determined, optimal values for machine slip frequency and machine air gap flux may be obtained from one of the first and second sets of tables, respectively, and the first and second output signals of signal processing circuit 26 may be generated accordingly. The drawback in using such a system is that it operates under the assumptions that: (1) machine parameters remain constant; and (2) voltage and current waves do not contain any harmonics or contain a predetermined amount of harmonics. In practical systems, such conditions are rarely met.

Figure 10:
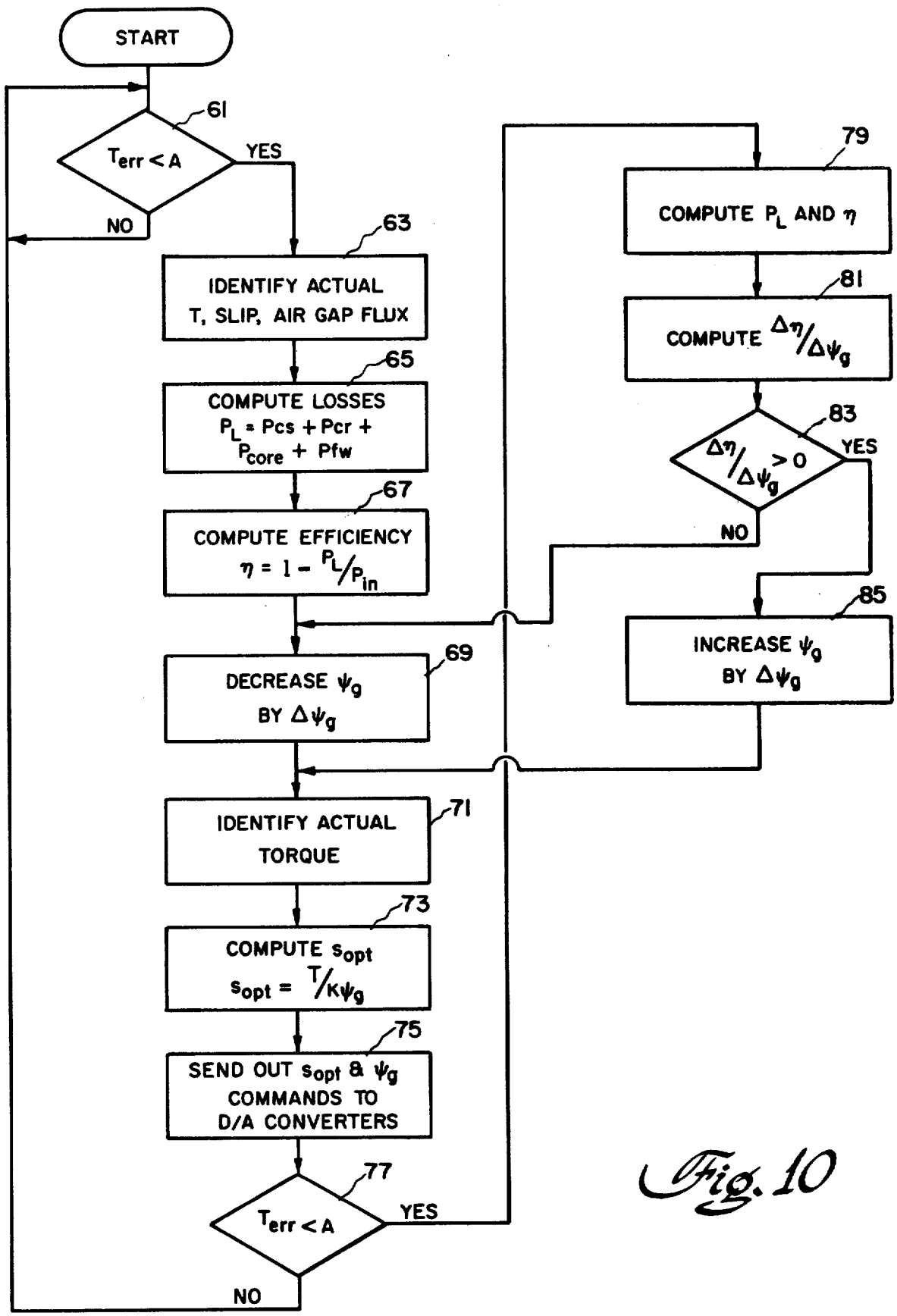
FIG. 10 is a flow chart of the program executed by the control apparatus of FIG. 1 to determine optimum machine slip frequency and optimum machine air gap flux.

The optimum values for air gap flux and slip are determined in signal processing circuit 26 during steady state operation of the motor. The flow chart of FIG. 10 shows the steps used to obtain the optimum values of air gap flux and slip. When the induction motor is operating at less than full load, tradeoffs are possible between air gap flux and slip. Airgap flux can be reduced from its maximum, and slip increased, to reduce the overall losses of the motor. As air gap flux decreases for a given value of torque, current supplied to the inverter must increase. Referring to the flow chart in FIG. 10, the torque error is checked, as indicated in decision block 61, to determine whether it is less than a predetermined value, such as 5% of commanded torque for example. If the torque error is greater than the predetermined value, the steady state has not been reached and a determination of optimum values is not begun. When the steady state has been reached, torque slip and air gap flux are measured, as indicated in function block 63. The stator copper loss, rotor copper loss, core loss and friction and windage loss are next determined, as indicated in block 65.

Motor efficiency is determined, as indicated in block 67, from the losses and power input to the motor. The measured air gap flux is next decreased by small value which can be 0.001 or less (1 bit for example), as indicated in block 69. The maximum and minimum values beyond which the air gap flux will not be increased or decreased are determined by saturation and inverter current handling capacity, respectively. The actual torque is again measured, as indicated in block 71, and the slip needed to maintain the measured torque using the decremented air gap flux is determined in the manner indicated in block 75. The slip command and the air gap command are sent to analog-to-digital converters in processing circuit 26, as shown by block 75, which provide first and second analog signals, respectively, representative of these values. These signals are applied to loops 32 and 34, as shown in FIG. 1, which control the magnitude and frequency of the stator current, respectively, in a manner which will be described in greater detail below.

The torque error is again checked, as indicated in block 77, to make sure that the motor is still operating in the steady state. If the motor is not in the steady state mode, calculations will cease. However, if the steady state condition still prevails, losses and efficiency are again determined, as indicated by block 79. Thus, the ratio $\Delta\eta/\Delta\psi_g$ is determined, as indicated in block 81, wherein $\Delta\eta$ is the difference between the previously computed and newly computed value of machine efficiency and $\psi_g$ is the difference between the previous and newly computed value of air gap flux. The ratio of $\Delta\eta/\Delta\psi_g$ is compared to zero, as indicated in decision block 83. If the ratio $\Delta\eta/\Delta\psi_g$ is negative, indicating that the optimum value of $\psi_g$ is greater than the present value of $\psi_g$, then the air gap flux is increased, as indicated in function block 85, and if the ratio is positive, indicating that the optimum value of $\psi_g$ is less than the previous value, the air gap flux is decreased, as indicated in block 69. Torque is again determined, and the newly adjusted value of air gap flux and measured torque is used to find the corresponding value of slip, as indicated in blocks 71 and 73. The new values of slip and air gap flux are again sent to the control loops 32 and 34 in the circuit of FIG. 1, as indicated block 75. The steady state condition is again checked for, as indicated in block 77. The losses and efficiency are again computed to take into account the changes brought about by the new values of commanded air gap flux and efficiency. The ratio $\Delta\eta/\Delta\psi_g$ is determined, as indicated in block 81, and the ratio $\Delta\eta/\Delta\psi_g$ is compared to zero, as indicated in block 83, to determine whether air gap flux should be increased and slip decreased or whether air gap flux should be decreased and slip increased, to obtain maximum efficiency. As long as the machine is in the steady state, the values of slip and air gap flux are adjusted. If the ratio equals zero, the air gap flux is decreased and the air gap flux and slip values oscillate about their optimum values.

Figure 11A:
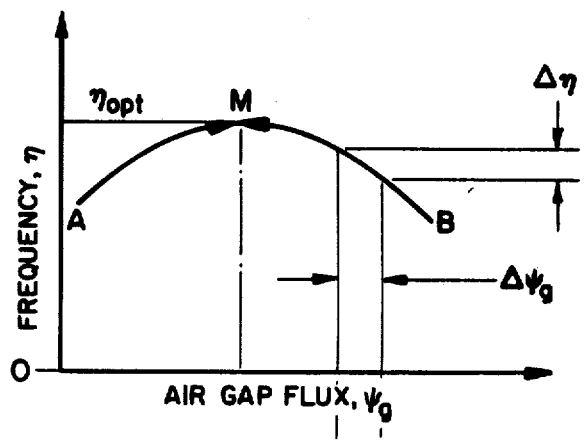
FIG. 11A is a graphic illustration of the relationship between machine efficiency and air gap flux with constant load torque.
Figure 11B:
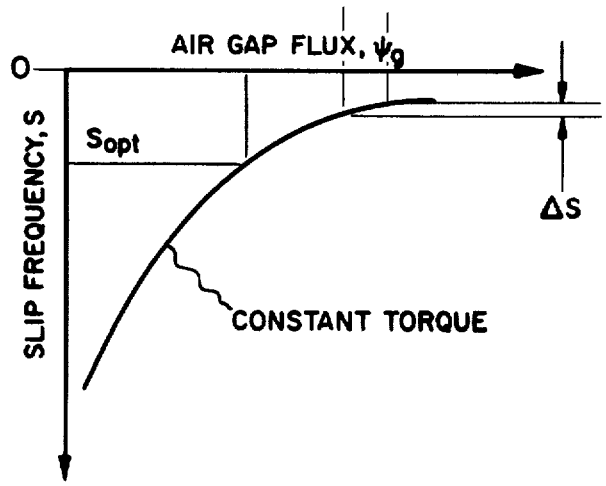
FIG. 11B is a graphical illustration of the relationship between slip frequency and machine air gap flux at constant load torque.

The above-described method for computing optimum air gap flux and optimum slip frequency is referred to as the sensitivity method of on-line optimization and may be better understood by reference to FIGS. 11A and 11B. Referring to FIG. 11A, which illustrates the typical relationship between machine efficiency and machine air gap flux, it can be observed that when machine air gap flux is less than the magnitude of machine air gap flux at maximum machine efficiency (point M on the curve), the slope ($\Delta\eta/\Delta\psi_g$ opt) of the efficiency vs. air gap curve is greater than zero. Conversely, when the machine air gap flux is greater than the optimum machine air gap flux magnitude, the slip of the efficiency vs. air gap flux curve is negative. By selecting an air gap flux value on the curve and adjusting its magnitude upwards or downwards so that $\Delta\eta/\Delta\psi_g$ opt=0, optimum air gap flux can readily be obtained.

During steady state machine conditions, when machine speed N and load torque T are constant, optimum slip frequency $S_{opt}$ is determined in accordance with the relationship expressed in equation (8), supra, and is illustrated graphically in FIG. 11B. It will be readily apparent to those skilled in the art that optimum slip frequency $S_{opt}$ could just as easily be computed first in accordance with the sensitivity method of on-line optimization and that optimum machine air gap flux would thereafter be determined from equation (5).

Referring again to FIG. 1, signals $\psi_g$ opt and $s_{opt}$ are applied to first and second control loops 32, 34, respectively through switches 93 and 95, respectively. Control loop 32 controls the firing sequence of thyristors 22a–22f to adjust the magnitude of current Id, and therefore the magnitude of the stator currents of motor 14, as a function of the optimal air gap flux $\psi_g$ opt. To this end, first control loop 32 includes a first difference amplifier 36 which generates a flux command signal $\psi_g$comm is a function of the difference between the optimum air gap flux determined by signal processing circuit 26, and the actual air gap flux determined by flux detector 31. Flux command signal $\psi_g$comm is applied to a controller 38 which includes a high gain amplifier and a compensator, as is conventional in the art, and generates a current command signal Icomm indicative of the magnitude of the optimum current appearing at the output of dc source 18 (and therefore indicative of the magnitude of the optimum stator currents) to achieve optimum machine efficiency.

Signal Icomm is applied to a second difference amplifier 40 which generates a current error signal Ierr as a function of the difference between the current command signal Icomm and the actual current dc link signal Id from a current sensor 41. This error signal is applied to a second controller 42 which supplies thyristor firing circuit 44 with a stator current control signal in accordance with the output signal of amplifier 40. The current error signal Ierr controls the operation of thyristor firing circuit 44 so as to cause the magnitude of current signal Id (and therefore the magnitude of the stator currents) to follow the current command signal Icomm. Configured in this manner, first control loop 32 regulates actual stator current in accordance with optimum air gap flux as determined by signal processing circuit 26. Various thyristor firing circuits exist and are well known in the art. As such, the details of firing circuit 44 are not shown. For a further, more detailed description of thyristor firing circuits, reference should be had to the *General Electric Silicon Controlled Rectifier Handbook*, (Fifth Edition) published by the Semiconductor Products Department of General Electric Company, Syracuse, N.Y. (1972).

The sound output signal $s_{opt}$ generated by signal processing circuit 26 is applied to second control loop 34 which controls the operation of inverter circuit 20 so as to cause the slip frequency of motor 14 to follow the optimum slip frequency determined by signal processing circuit 26. To this end, control circuit 34 includes a summing amplifier 46 which receives the optimum slip frequency signal $s_{opt}$ generated by signal processing circuit 26 and adds it to speed signal N generated by tachometer 29. The resultant command signal Ne is indicative of the desired frequency of the stator currents of motor 14. This signal is applied to frequency converter 48 whose output is coupled to pulse distributor 50. Pulse distributor 50 applies firing pulses to the gates of thyristors 24 so as to attain the desired output frequency. As a result of this configuration, the frequency of the current signals applied to the stator of motor 14 is adjusted in a manner which causes the slip frequency of motor 14 to follow the optimum slip frequency $s_{opt}$ determined by signal processing circuit 26 while at the same time causing the output speed N of motor 14 to remain at a desired value. Accordingly, control loops 32 and 34 cooperate with signal processing circuit 28 to cause motor 14 to operate at optimum efficiency.

Machine efficiency may be visually displayed with the addition of a display apparatus 62, shown in FIG. 1, coupled to signal processing circuit 26. By suitably modifying the program illustrated in flow chart form in FIG. 10 to include the step of displaying machine efficiency after computation thereof, a visual indication of efficiency may be provided on display 62.

Regulation of machine stator current by control circuit 12, although advantageous during intervals of steady state machine operation, is not desirable during intervals of transient machine conditions because during these intervals machine parameters change too quickly to permit accurate computation of machine efficiency. Therefore, operation of signal processing circuit 26 is inhibited during transient machine conditions by a sensitivity loop 52. Sensitivity loop 52 includes a first difference amplifier 54 which generates a speed error signal Nerr indicative of the difference between the speed command signal N* (representative of the desired output speed of motor 14) and the actual output speed N as indicated by tachometer 29. The error signal Nerr is applied to a speed controller 56, which includes a high gain amplifier (not shown) and a compensator (not shown) and generates a torque command signal Tcomm as a function of the speed error signal. The torque command signal Tcomm is applied to a second difference amplifier 58 which compares the torque command signal to the actual torque signal T generated by signal processing circuit 26 and determined in accordance with equation (5). Alternatively, a separate torque detector could be provided. The output of difference amplifier 58 is coupled to a torque controller 60 which provides a torque error signal $T_{err}$ to signal processing circuit 26. During intervals of transient machine conditions, when the torque error signal $T_{err}$ exceeds a predetermined magnitude, signal processing circuit 26 temporarily ceases operation, thereby preventing machine stator current from being regulated in accordance with machine efficiency during such intervals. When the signal processing circuit is not providing the optimum air gap flux signal and the optimum slip signal during machine transient conditions, rated flux from a rated flux signal generated circuit 91 is provided to loop 32 and a torque error signal from torque error controller 60 is supplied to loop 34 through switch 95 instead of the optimum slip signal. When steady state conditions are reached, switches 93 and 95 provide a path to summers 36 and 46, respectively, for the optimum values of air gap flux.

In the embodiment of the present invention illustrated in FIG. 1, the control circuit 12 controls the operation of a power supply 16 which employs a current-fed inverter drive system. The present invention can also be used, for example, in connection with a power supply which incorporates a voltage-fed pulse-width modulated inverter drive system. Such a system is illustrated schematically in FIG. 12. A full bridge diode rectifier 65 coupled to a three-phase ac power supply provides a dc voltage to a voltage-controlled inverter 67 employing transistors. In this case, the transistor base drive pulses are provided by control circuit 12 to control both voltage and frequency supplied to the motor.

The foregoing describes a microcomputer based control apparatus for an induction machine drive system. The microcomputer-based control apparatus accomplishes real time computation of machine efficiency and adjusts the magnitude and frequency of machine stator current or voltage by feedback control responsive to optimum machine air gap flux and optimum machine slip frequency, respectively. The optimum air gap flux and optimum slip frequency are determined by the microcomputer in accordance with the computed machine efficiency.

While the invention has been particularly shown and described with reference to several preferred embodiments thereof, it will be understood by those skilled in the art that various changes and form and detail may be made therein without departing from the true spirit and scope of the invention as defined by the appended claims.

What is claimed is:

1. A method of controlling an induction machine drive during steady state operation using a microcomputer having stored machine constants, the machine drive having an stator current control loop and a stator frequency control loop, said method comprising the steps of:
    (1) measuring induction machine slip, torque and air gap flux;
    (2) determining machine stator copper loss, rotor copper loss and iron loss from measured variables and machine constants;
    (3) determining machine efficiency from machine losses and power input to the machine;
    (4) processing machine efficiency as a function of air gap flux to determine whether air gap flux should be increased or decreased to increase machine efficiency;
    (5) varying air gap flux by a predetermined amount in the direction determined in step 4;
    (6) varying frequency so that the previously determined torque is maintained;
    (7) commanding the new values of air gap flux and frequency in said stator current control loop and said stator frequency control loop, respectively; and
    (8) repeating steps 1–8.

2. The method of claim 1 wherein the step of determining machine stator copper loss, rotor copper loss and iron loss comprises the steps of:
    (1) sampling the motor stator current;
    (2) smoothing the sampled stator current by passing the stator current through a low pass filter;
    (3) detecting the zero crossings of the smoothed current samples;
    (4) dividing the half cycle of the sampled waveform into a predetermined number of intervals;
    (5) sampling the motor stator current at each of the intervals determined in step 4;
    (6) determining the root mean square of the stator current from the sampled values of step 5;
    (7) determining the fundamental component of the stator current from the sampled values of step 5; and
    (8) using the fundamental and root mean square values of stator current in determining machine losses.

3. A method of controlling an induction machine drive during steady state operation using a microcomputer having stored machine constants, the machine drive having a stator voltage control loop and a stator frequency control loop, said method comprising the steps of:
    (1) determining induction machine slip, torque and air gap flux;
    (2) determining machine stator copper loss, rotor copper loss and iron loss from measured variables and machine constants;
    (3) determining machine efficiency from machine losses and power input to the machine;
    (4) processing machine efficiency as a function of air gap flux to determine whether air gap flux should be increased or decreased to increase machine efficiency;
    (5) varying air gap flux by a predetermined amount in the direction determined in step 4;
    (6) varying frequency so that the previously determined torque is maintained;
    (7) commanding the new values of airgap flux and frequency in said stator voltage control loop and said stator frequency control loop, respectively; and
    (8) repeating steps 1–8.

4. The method of claim 3 wherein the step of determining machine stator copper loss, rotor copper loss and iron loss comprises the steps of:
    (1) sampling the motor stator current;
    (2) smoothing the sampled stator current by passing the stator current through a low pass filter;
    (3) detecting the zero crossings of the smoothed current samples;
    (4) dividing the half cycle of the sampled waveform into a predetermined number of intervals;
    (5) sampling the motor stator current at each of the intervals determined in step 4;
    (6) determining the root mean square of the stator current from the sampled values of step 5;
    (7) determining the fundamental component of the stator current from the sampled values of step 5; and
    (8) using the fundamental and root mean square values of stator current in determining machine losses.

5. A method of generating an air gap flux command and a slip command for a converter-fed induction motor drive comprising the steps of:
    (1) determining the torque error and proceeding to step 2 when the torque error is below a predetermined amount;
    (2) sensing stator current and voltage and machine angular velocity;
    (3) determining stator fundamental RMS current and ripple current from the sensed stator current;
    (4) determining machine losses from known machine parameters, machine speed and stator RMS and ripple current,
    (5) determining machine efficiency from machine losses and machine stator currents and losses;
    (6) determining machine air gap flux;
    (7) decreasing machine air gap flux by a predetermined amount to obtain a new value of air gap flux;
    (8) measuring machine torque;
    (9) determining a new value of machine slip corresponding to the new value of machine air gap flux to maintain machine torque at its measured value;
    (10) commanding the new values of machine air gap flux and slip;
    (11) performing steps 1–4;
    (12) processing machine efficiency as a function of air gap flux to determine whether air gap flux should be increased or decreased to increase machine efficiency;
    (—) varying air gap flux by a predetermined amount in the direction determined in step 12;

(14) performing steps 8 and 9;
(15) repeating steps 1–5, 8, 12, 13, 14 and 15.

6. A method of generating an air gap flux command and a slip command for a converter-fed induction motor drive comprising the steps of:
 (1) determining the torque error and proceeding to step 2 when the torque error is below a predetermined amount;
 (2) sensing stator current and voltage and machine angular velocity;
 (3) determining stator fundamental RMS current and ripple current from the sensed stator current;
 (4) determining machine losses from known machine parameters, machine speed and stator RMS and ripple current,
 (5) determining machine efficiency from machine losses and machine stator currents and losses;
 (6) determining machine air gap flux;
 (7) decreasing machine slip by a predetermined amount to obtain a new value of slip;
 (8) measuring machine torque;
 (9) determining a new value of machine air gap flux corresponding to the new value of machine slip to maintain machine torque at its measured value;
 (10) commanding the new values of machine air gap flux and slip;
 (11) performing steps 1–4;
 (12) processing machine efficiency as a function of slip to determine whether slip should be increased or decreased to increase machine efficiency;
 (13) varying slip by a predetermined amount in the direction determined in step 12;
 (14) performing steps 8 and 9;
 (15) repeating steps 1–5, 8, 12, 13, 14 and 15.

* * * * *